May 1, 1923.　　　　　　　　　　　　　　　　　1,453,627
R. A. J. KING
AIR FILTER FOR AUTOMOBILES
Filed April 3, 1922
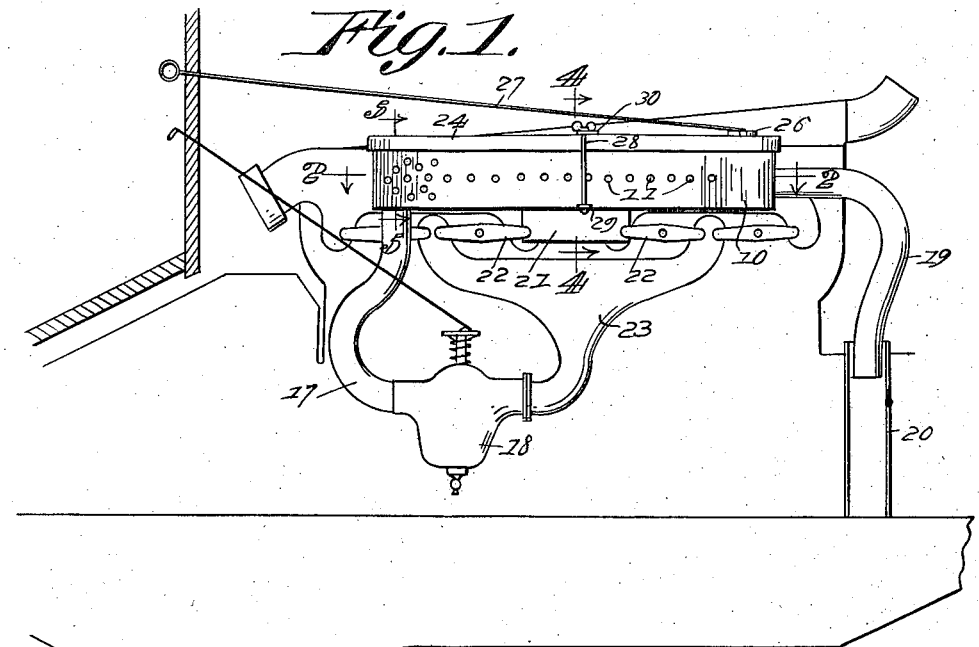
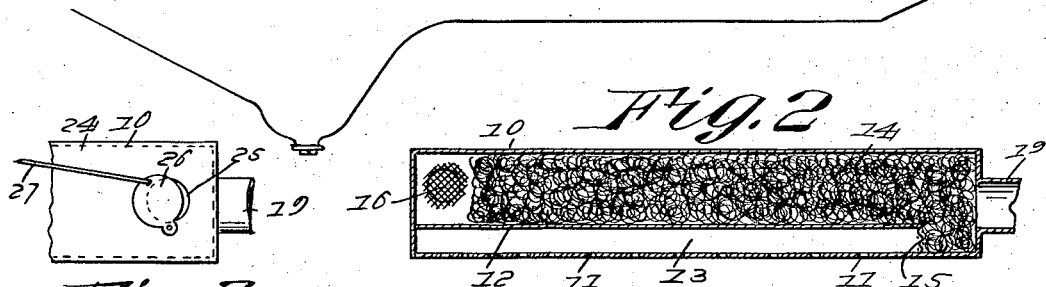
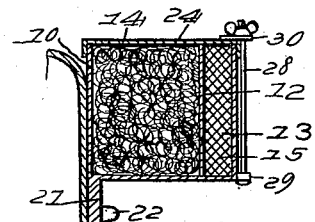
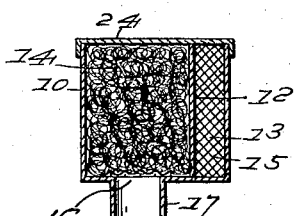
Inventor,
Ralph A. J. King
By Franks Anderway
Attorney Patented May 1, 1923.

1,453,627

UNITED STATES PATENT OFFICE.

RALPH A. J. KING, OF CHEROKEE, OKLAHOMA.

AIR FILTER FOR AUTOMOBILES.

Application filed April 3, 1922. Serial No. 549,245.

*To all whom it may concern:*

Be it known that I, RALPH A. J. KING, a citizen of the United States, and resident of Cherokee, in the county of Alfalfa and State of Oklahoma, have invented certain new and useful Improvements in Air Filters for Automobiles, of which the following is a specification.

This invention relates to filters for air supplied to carburetors of internal combustion motors, and it has for an object the provision of novel means whereby the air is freed of dust and such foreign particles in its passage to the carburetor in order that the carburetor will be kept free and unobstructed for the passage of the fuel charge of carbureted air.

A still further object of this invention is to provide novel means whereby the said air will be heated in its passage through the filter; and furthermore the provision of novel means whereby the filter is held in place on a motor in such relation to the breather pipe of the motor as to communicate therewith for the purpose of reclaiming gas which may escape by leaking between the piston and cylinder walls, as so often occurs in motors with imperfectly adjusted parts.

It is a further object of this invention to produce a device of the character indicated which is comparatively simple in construction and inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Fig. 1 illustrates a view in elevation showing a device embodying the invention applied to a motor;

Figure 2 illustrates a sectional view on the line 2—2 of Fig. 1;

Figure 3 illustrates a top plan view of a fragment of the filter;

Figure 4 illustrates a sectional view through the filter, and a fragment of the crank case on the line 4—4 of Fig. 1; and Figure 5 illustrates a sectional view of the filter on the line 5—5 of Fig. 1.

In these drawings and in the present embodiment of the invention, the receptacle or casing 10 for the filtering agent comprises what might be termed a substantially rectangular box having its outer side wall provided with a plurality of perforations 11 to form passages by which air may enter the casing, and the said casing has a longitudinally extending partition 12 leading from one end wall to a point near the other end wall forming a space 13 for the circulation of air and a larger space 14 for the filtering agent which may be in the nature of mineral wool or the like, preferably saturated or coated with oil in order that air passing therethrough will be relieved of foreign substances that will cling to the filtering agent. A screen 15 reaches from the free end of the partition to the side wall at the end of the passage 13 to confine the filtering agent and prevent its entering the channel. Near one end of the casing its bottom is provided with an aperture 16 to which a pipe 17 is connected leading to the carburetor 18, which carburetor is here but conventionally shown.

A pipe 19 communicates with the interior of the casing at the opposite end and said pipe extends into the breather pipe or tube 20 of the motor. The pipe 19 is preferably flexible such as a hose so that it may be adapted to motors having breather tubes at different positions with relation to other parts of the mechanism, it being the purpose of this pipe 19, as stated, to afford a means by which gas that has escaped into the crank case may be reclaimed and drawn through the filter under the influence of the intake strokes of the motor.

The casing has a flange 21 which is preferably of such length as to extend between and under the ends of two of the clamps 22 by which the manifold 23 of the motor is held in place so that the said receptacle or casing may be held in operative relation to the remainder of the elements of the motor.

A lid or cover 24 is applied to the casing and it has an aperture 25 closed by a shutter or valve 26 under the control of a rod 27 which may be manipulated from the driver's seat of the automobile in order that the aperture 25 may be opened or closed to a greater or less extent, according to the requirements due to weather conditions, it being understood that when the weather in warm, it need not be so highly heated and therefore can be admitted to the casing without being compelled to travel a circuitous passage.

The cover is flanged to embrace the receptacle or casing at its upper edge and the cover is held in place by a clamping bolt 28 which passes through an apertured plate 29 attached to the casing near its bottom and to an apertured plate 30 on the cover. By the manipulation of the nut of the bolt the cover may be secured in place or released, according to the wishes of an operator.

I claim:

1. In an air filter for automobiles, a substantially rectangular casing, a partition extending longitudinally of the casing from one of its end walls and forming with the outer wall of the casing a passage for air, the said casing being apertured to admit air to the passage, a filtering agent in the said casing outside of the passage, means for retaining the filtering agent against access to the passage, a pipe communicating with the casing at one end and adapted to lead to a carburetor, a pipe communicating with the casing and adapted to extend into the breather tube of a motor, a cover for the said casing, and a flange on the said casing adapted to be engaged by manifold clamps of a motor for retaining the casing in operative relation to the parts of the motor.

2. In an air filter for automobiles, a substantially rectangular casing, a partition extending longitudinally of the casing from one of its end walls and forming with the outer wall of the casing a passage for air, the said casing being apertured to admit air to the passage, a filtering agent in the said casing outside of the passage, means for retaining the filtering agent against access to the passage, a pipe communicating with the casing at one end and adapted to lead to a carburetor, a pipe communicating with the casing and adapted to extend into the breather tube of a motor, a cover for the said casing, means for securing the cover on the casing, the said cover having an aperture for the passage of air, means for controlling the aperture, and a flange on the said casing adapted to be engaged by manifold clamps of a motor for holding the said casing in operative relation to the carburetor.

RALPH A. J. KING.